US011876729B2

(12) United States Patent
de Oliveira Barbalho

(10) Patent No.: US 11,876,729 B2
(45) Date of Patent: Jan. 16, 2024

(54) METHOD AND SYSTEM FOR A PROACTIVE ASSIGNMENT OF VIRTUAL NETWORK FUNCTIONS IN LOCAL DATA SYSTEMS

(71) Applicant: EMC IP Holding Company LLC, Hopkinton, MA (US)

(72) Inventor: Hugo de Oliveira Barbalho, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 17/383,335

(22) Filed: Jul. 22, 2021

(65) Prior Publication Data
US 2023/0024892 A1 Jan. 26, 2023

(51) Int. Cl.
| H04L 47/78 | (2022.01) |
| H04L 47/762 | (2022.01) |
| H04L 9/40 | (2022.01) |
| H04L 43/0882 | (2022.01) |
| H04L 43/062 | (2022.01) |
| H04L 41/40 | (2022.01) |

(52) U.S. Cl.
CPC ............ *H04L 47/781* (2013.01); *H04L 41/40* (2022.05); *H04L 43/062* (2013.01); *H04L 43/0882* (2013.01); *H04L 47/762* (2013.01); *H04L 63/1416* (2013.01)

(58) Field of Classification Search
None
See application file for complete search history.

(56) References Cited

U.S. PATENT DOCUMENTS

| 2017/0104847 A1* | 4/2017 | Zhang ..................... H04L 67/63 |
| 2018/0139154 A1* | 5/2018 | Rajagopal ............. H04L 41/122 |
| 2021/0211350 A1* | 7/2021 | Olson ................. H04L 41/5019 |

(Continued)

FOREIGN PATENT DOCUMENTS

| CN | 108111437 A | * | 6/2018 | ......... H04L 47/6275 |
| CN | 108260169 | * | 8/2018 | |
| KR | 20200085005 A | * | 7/2020 | |

OTHER PUBLICATIONS

W. Rankothge, J. Ma, F. Le, A. Russo and J. Lobo, Towards making network function virtualization a cloud computing service, 2015 IFIP/IEEE International Symposium on Integrated Network Management (IM), Ottawa, ON, Canada, pp. 89-97 (Year: 2015).*

(Continued)

*Primary Examiner* — Christopher M Crutchfield
(74) *Attorney, Agent, or Firm* — Chamberlain, Hrdlicka, White, Williams & Aughtry; Aly Z. Dossa

(57) ABSTRACT

A method for managing data includes obtaining, by a service function chain (SFC) orchestrator, a SFC request for a SFC, wherein the SFC comprises at least one virtual network function (VNF) and one service, in response to the SFC request: determining a set of candidate local data systems (LDSs) based on a resource availability mapping, performing a LDS analysis on the set of candidate LDSs, based on the LDS analysis: assigning the VNF to a candidate LDS of the set of candidate LDSs, assigning the service to a second LDS of the set of candidate LDSs, and based on the assigning of the VNF and the assigning of the service, initiating a deployment of the VNF and the service.

17 Claims, 7 Drawing Sheets

(56) References Cited

U.S. PATENT DOCUMENTS

2022/0247688 A1\* 8/2022 Puente Pestaña ... H04L 45/0377

OTHER PUBLICATIONS

Joe Wenjie Jiang, Tian Lan, Sangtae Ha, Minghua Chen, Mung Chiang, Joint VM Placement and Routing for Data Center Traffic Engineering, pp. 1-9 (Year: 2012).\*

J. Halpern, C. Pignataro, Service Function Chaining (SFC) Architecture, Doc No. RFC 7665, pp. 1-32 (Year: 2015).\*

K. Kaur, S. Garg, G. Kaddoum, E. Bou-Harb and K.-K. R. Choo, "A Big Data-Enabled Consolidated Framework for Energy Efficient Software Defined Data Centers in IoT Setups," in IEEE Transactions on Industrial Informatics, vol. 16, No. 4, pp. 2687-2697, April (Year: 2020).\*

L. Guo, J. Pang and A. Walid, "Joint Placement and Routing of Network Function Chains in Data Centers," IEEE INFOCOM 2018—IEEE Conference on Computer Communications, Honolulu, HI, USA, , pp. 612-620 (Year: 2018).\*

\* cited by examiner

METHOD AND SYSTEM FOR A PROACTIVE ASSIGNMENT OF VIRTUAL NETWORK FUNCTIONS IN LOCAL DATA SYSTEMS

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for managing data. The method includes obtaining, by a service function chain (SFC) orchestrator, a SFC request for a SFC, wherein the SFC comprises at least one virtual network function (VNF) and one service, in response to the SFC request: determining a set of candidate local data systems (LDSs) based on a resource availability mapping, performing a LDS analysis on the set of candidate LDSs, based on the LDS analysis: assigning the VNF to a candidate LDS of the set of candidate LDSs, assigning the service to a second LDS of the set of candidate LDS s, and based on the assigning of the VNF and the assigning of the service, initiating a deployment of the VNF and the service.

In general, the invention relates to a non-transitory computer readable medium comprising computer readable program code, which when executed by a computer processor enables the computer processor to perform a method for managing data. The method includes obtaining, by a service function chain (SFC) orchestrator, a SFC request for a SFC, wherein the SFC comprises at least one virtual network function (VNF) and one service, in response to the SFC request: determining a set of candidate local data systems (LDSs) based on a resource availability mapping, performing a LDS analysis on the set of candidate LDSs, based on the LDS analysis: assigning the VNF to a candidate LDS of the set of candidate LDSs, assigning the service to a second LDS of the set of candidate LDSs, and based on the assigning of the VNF and the assigning of the service, initiating a deployment of the VNF and the service.

In general, the invention relates to a system that includes a processor and memory that includes instructions, which when executed by the processor, perform a method for managing data. The method includes obtaining, by a service function chain (SFC) orchestrator, a SFC request for a SFC, wherein the SFC comprises at least one virtual network function (VNF) and one service, in response to the SFC request: determining a set of candidate local data systems (LDSs) based on a resource availability mapping, performing a LDS analysis on the set of candidate LDSs, based on the LDS analysis: assigning the VNF to a candidate LDS of the set of candidate LDSs, assigning the service to a second LDS of the set of candidate LDSs, and based on the assigning of the VNF and the assigning of the service, initiating a deployment of the VNF and the service.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference, and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing the operations of service function chains (SFCs). The SFCs may be a designated order of a set of elements to be performed by one or more local data systems. The elements may include one or more instances of virtual network functions and one or more services. Embodiments of the invention may include performing an assignment of each element in a set of SFCs between a set of local data systems. The assignment of the virtual network functions ("VNFs") and services to the local data systems may be based on multiple factors such as, for example, the availability of the computing resources of the local data systems, the network capability of each local data system among each other, and a latency cost of the network connections between the combination of local data systems performing the elements of the SFC. Following the assignment of each element of the SFC, the elements may be deployed in the local data systems.

Figure 1A:
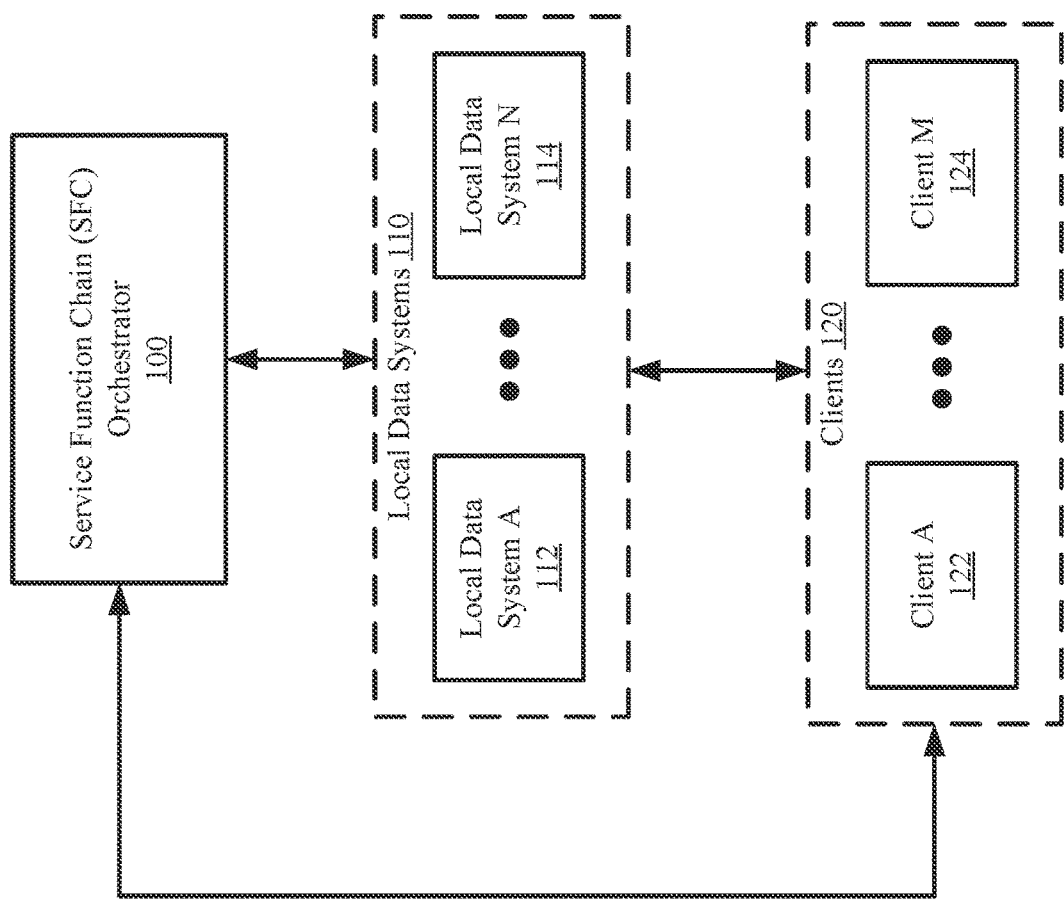
FIG. 1A shows a diagram of a system in accordance with one or more embodiments of the invention.

FIG. 1A shows a diagram of a system in accordance with one or more embodiments of the invention. The system includes a SFC orchestrator (100), local data systems (110), and clients (120). Each component of the system may be operably connected via any combination of wired and/or wireless connections. Each component of the system illustrated in FIG. 1A is discussed below.

In one or more embodiments of the invention, the SFC orchestrator (100) is a device that facilitates the orchestration of service function chains and the deployment of elements of the SFCs in the local data systems (110). A SFC may be a process for executing a set of elements in a specified order. The elements may include at least one or more virtual network functions (VNFs). In one or more embodiments of the invention, a VNF is an application that provides network functionality for a client (122, 124) while accessing a service. Examples of network functionality include, but are not limited to: a firewall instance, an intrusion detection, a login instance, a network traffic monitoring agent, and a network usage monitoring agent. The VNF may provide an abstraction of the network functionality from a computing device such that the network functionality may not be limited to a single computing device (e.g., a local data system (112, 114)). In this manner, the VNF may be deployed to a local data system by the SFC orchestrator (100).

Figure 4:
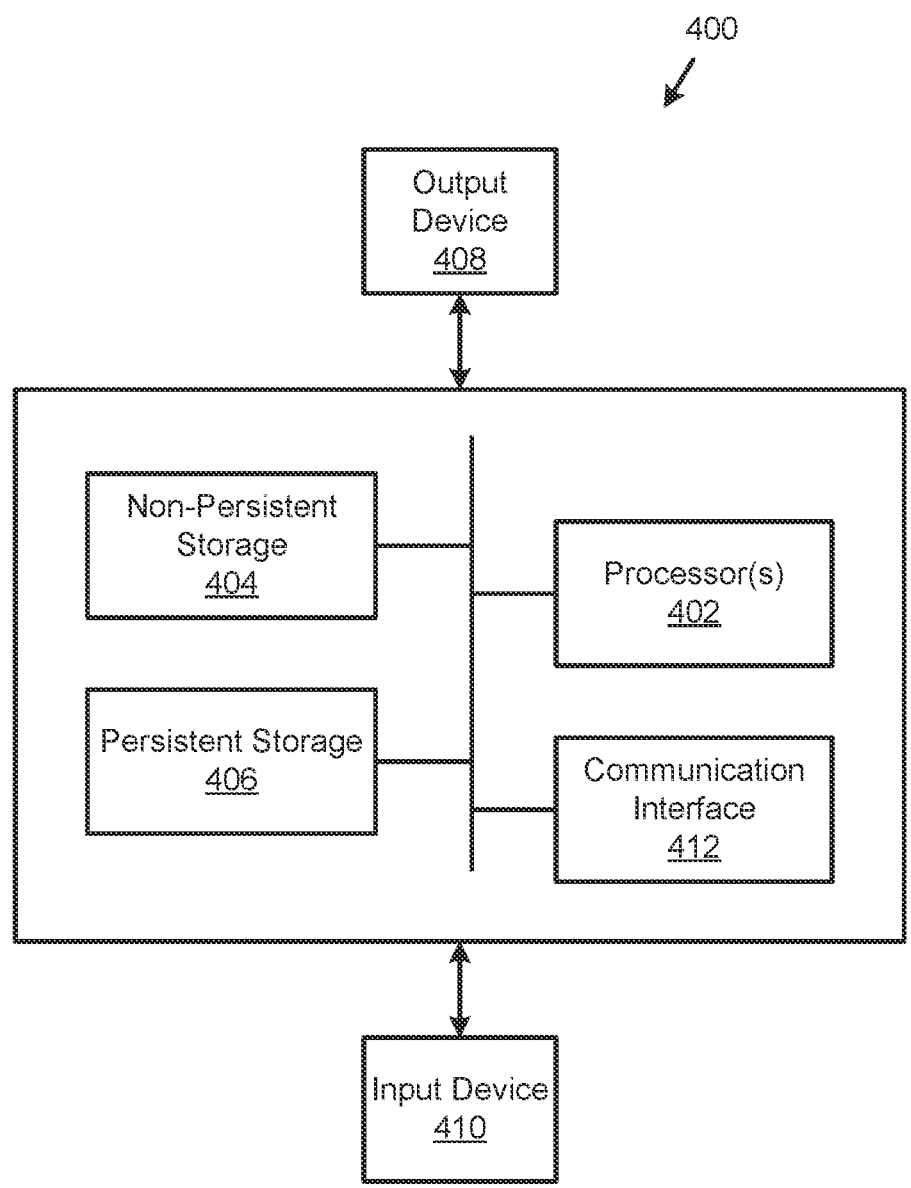
FIG. 4 shows a diagram of a computing device in accordance with one or more embodiments of the invention.

In one or more embodiments of the invention, the SFC orchestrator (100) is implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions; e.g., computer code, that when executed by the processor(s) of the computing device will cause the computing device to perform the functions of the SFC orchestrator (100) described in this application and/or all, or portion, of the methods illustrated in FIGS. 2A-2B.

The SFC orchestrator (100) may be implemented as a logical device without departing from the invention. The logical device utilizes computing resources, of any number of physical computing devices, to provide the functionality of the SFC orchestrator (100) described throughout this application and/or all, or portion, of the methods illustrated in FIGS. 2A-2B.

While the SFC orchestrator (100) is illustrated in FIG. 1A as a separate entity, the SFC orchestrator may be implemented as an application operated using a local data system (e.g., 112, 114). In other words, any of the local data systems (110) may perform the functionality of the SFC orchestrator (100) without departing from the invention.

In one or more embodiments of the invention, the local data systems (110) are systems that obtain data, store data, and/or execute applications based on the stored data. The local data systems (110) may provide the stored data and/or applications to the clients (120) as specified by terms agreed to by the clients (120) based on transactions between the clients (120) and the local data systems (110).

In one or more embodiments of the invention, each local data system (110) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the local data system (110) described throughout this application and/or all, or portion, of the method illustrated in FIG. 2B.

A local data system (112, 114) may be implemented as a logical device without departing from the invention. The logical device utilizes computing resources of any number of physical computing devices to provide the functionality of the local data system (112, 114) described throughout this application and/or all, or a portion, of the method illustrated in FIG. 2B. For additional details regarding a local data system (112, 114), see, e.g., FIG. 1B.

In one or more embodiments of the invention, the clients (120) may utilize computing resources and/or access data of the local data systems (110) based on terms established between the clients (120) and the local data systems (110). The clients (120) may communicate with the SFC orchestrator (100) to agree upon terms for accessing the computing resources.

In one or more embodiments of the invention, each client (122, 124) is implemented as a computing device (see, e.g., FIG. 4). A computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the client (122, 124) described throughout this application.

A client (122, 124) may be implemented as a logical device without departing from the invention. The logical device utilizes computing resources of any number of physical computing devices to provide the functionality of the client (122, 124) described throughout this application.

Figure 1B:
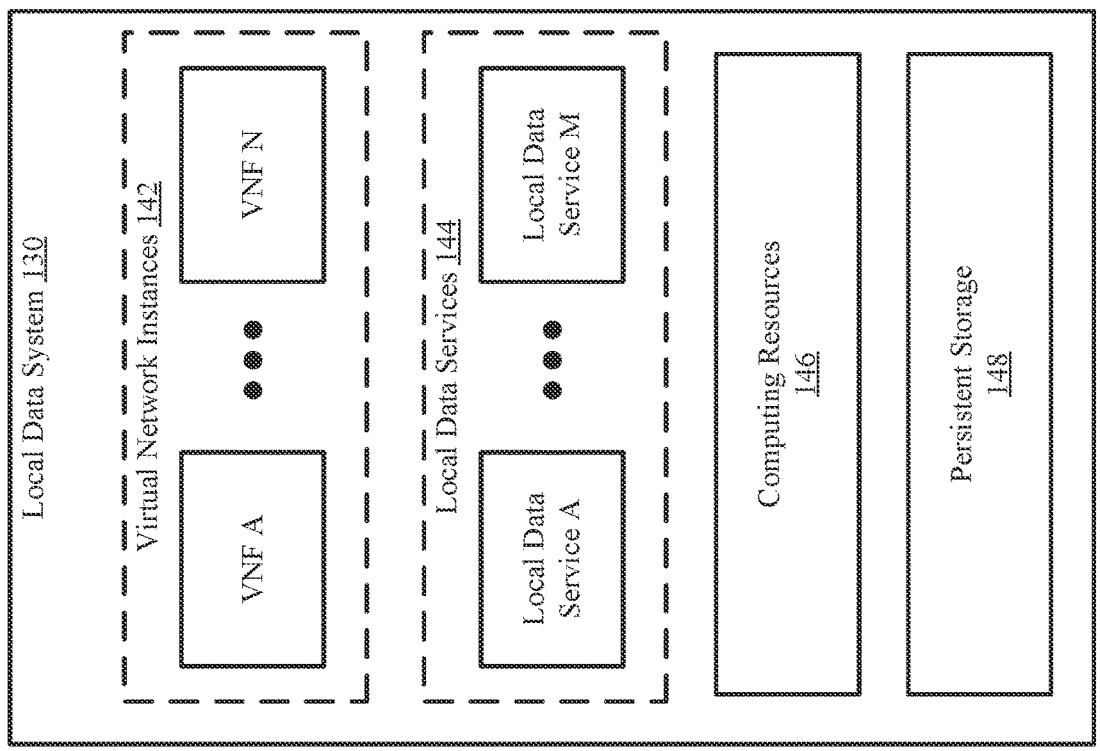
FIG. 1B shows a diagram of a local data system in accordance with one or more embodiments of the invention.

FIG. 1B shows a diagram of a local data system in accordance with one or more embodiments of the invention. The local data system (130) may be similar to a local data system (112, 114) discussed above. As discussed above, the local data system may obtain data, store data, and execute applications. To perform the aforementioned functionality, the local data system (130) may include one or more VNFs (142), one or more local data services (144), computing resources (146), and persistent storage (148). The local data system (130) may include additional, fewer, and/or different components without departing from the invention. Each of the aforementioned components is discussed below.

In one or more embodiments of the invention, the VNF instances (142) are elements of a SFC that provide network functionality for a client while accessing a service. Examples of network functionality include, but are not limited to: a firewall instance, an intrusion detection, a login instance, a network traffic monitoring agent, and a network usage monitoring agent. The VNF instances (142) may provide an abstraction of the network functionality from local data system (130) such that the network functionality may not be limited to a single computing device (e.g., the local data system (130)). In this manner, the VNF instances (142) may be deployed to the local data system by the SFC orchestrator (100, FIG. 1A).

In one or more embodiments of the invention, the local data services (144) (also referred to as services) are applications provided by local data system (130) that utilize the computing resources (146). The local data services (144) may be, for example, instances of databases, gaming servers, machine learning model implementations, instances of virtual machines, email servers, augmented reality servers, and/or any other services without departing from the invention.

In one or more embodiments of the invention, the computing resources (146) are resources (e.g., processing, storage, volatile memory, and/or network connections) used by the local data system (130), to perform various functions of the local data system (130), as well as to provide the VNF instances (142) and/or local data services (144) to external entities (e.g., clients or other local data systems). In one or more embodiments of the invention, a VNF instance or service specifies computing resources to be provided by one or more local data systems (e.g., 110, FIG. 1A) to the external entity.

The persistent storage (148) may be configured to store data. The persistent storage (148) may be a physical storage. For example, the persistent storage (148) may include hard disk drives, solid state drives, and/or tape drives for storing data. The persistent storage (148) may include other types of non-transitory storage mediums without departing from the invention.

Figure 2A:
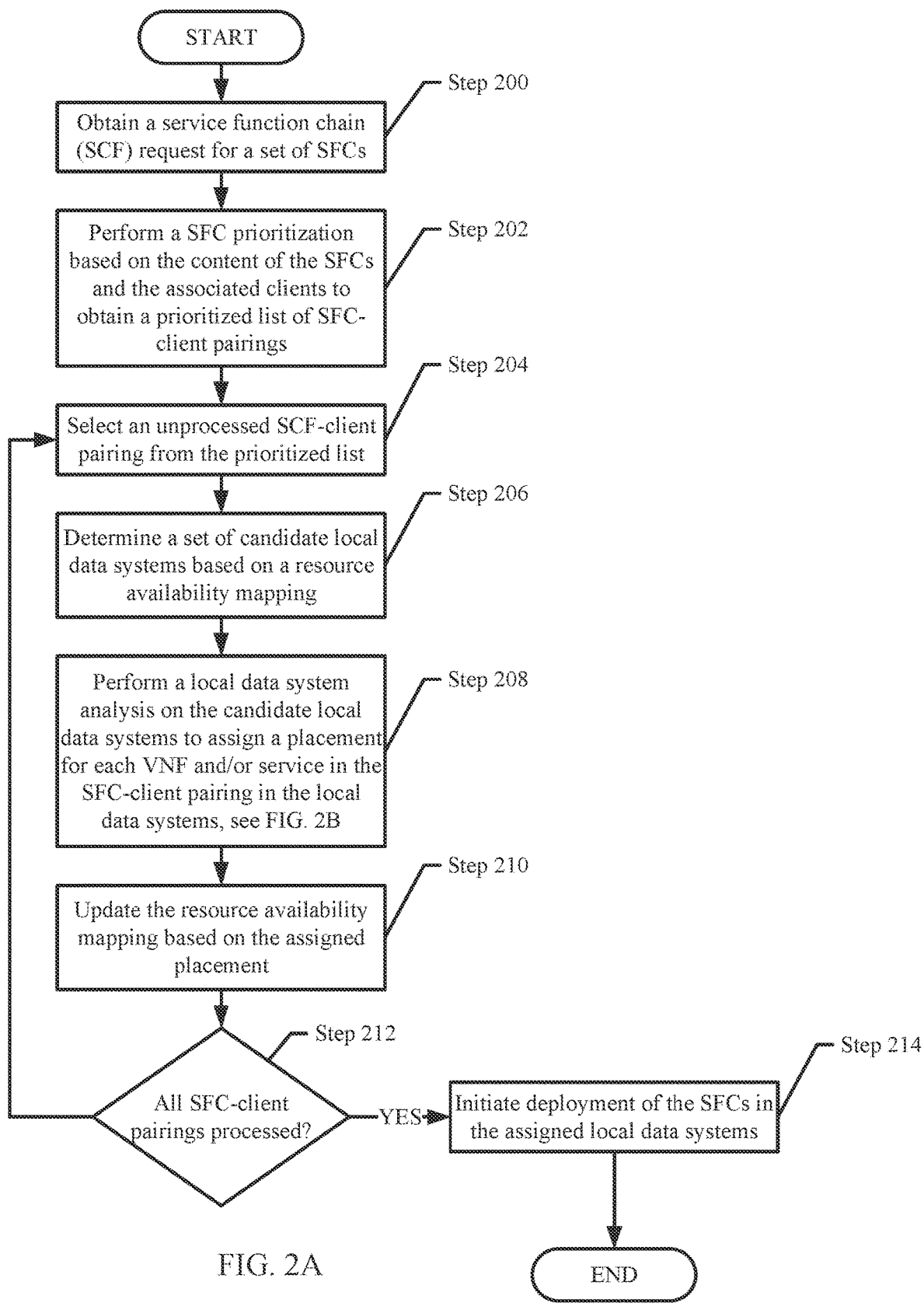
FIG. 2A shows a flowchart for assigning and deploying service function chains (SFCs) in local data systems in accordance with one or more embodiments of the invention.
Figure 2B:
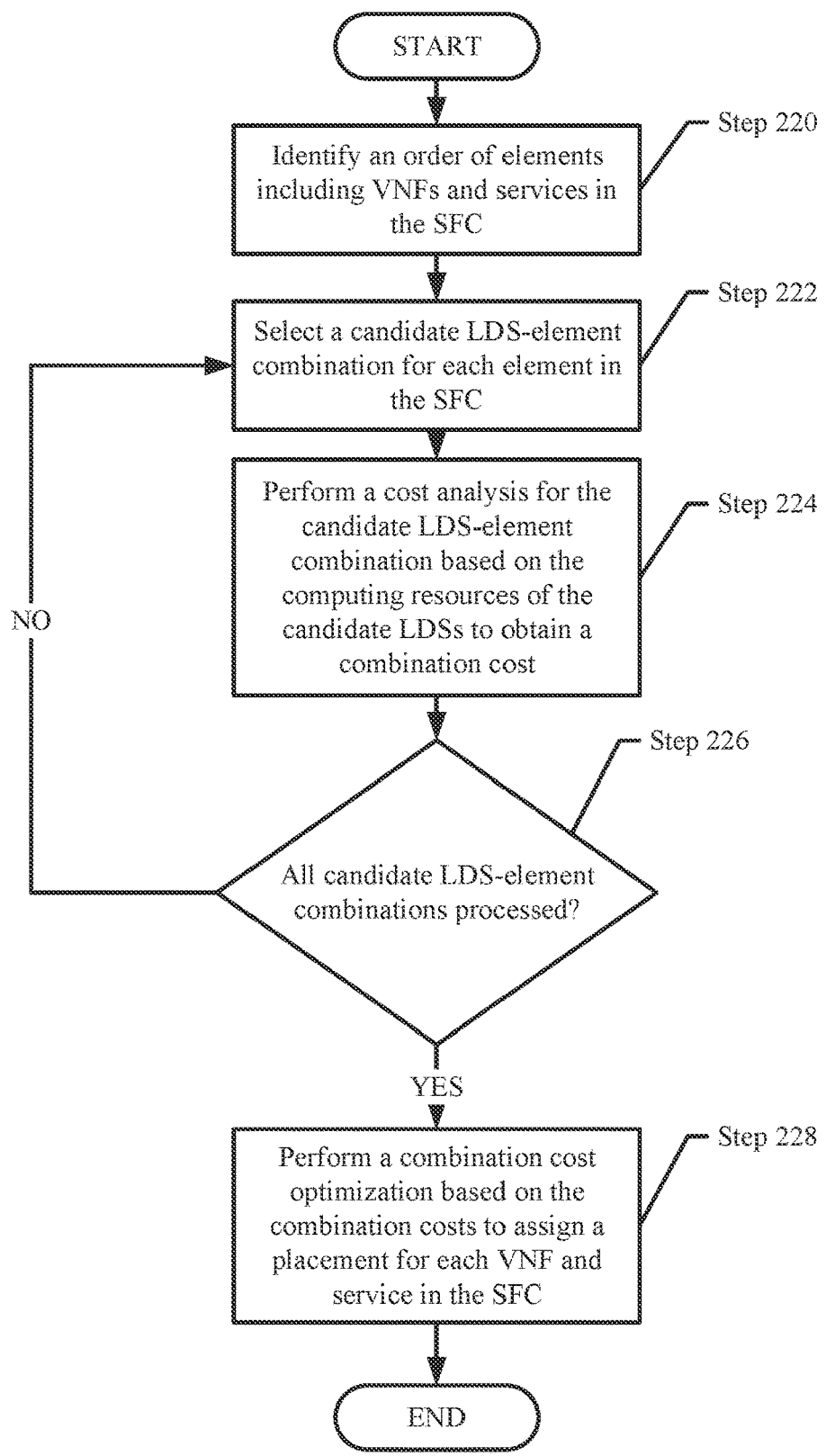
FIG. 2B shows a flowchart for performing a local data system analysis in accordance with one or more embodiments of the invention.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for assigning and deploying service function chains (SFCs) in local data systems in accordance with one or more embodiments of the invention. The method shown in FIG. 2A may be performed by, for example, a SFC orchestrator (100, FIG. 1A). Other components of the system illustrated in FIG. 1A may perform the method of FIG. 2A without departing from the invention.

Turning to FIG. 2A, in step 200, a, SFC request is obtained for a set of SFCs. In one or more embodiments of the invention, the SFC request specifies assigning each element of the SFCs to a local data system such that each client may access the functionalities of the respective SFC using the local data systems. Each SFC may be associated with a client. An element of a SFC may refer to a VNF or a local data service of the SFC.

In step 202, a SFC prioritization is performed based on the content of the SFCs, and the associated clients to obtain a prioritized list of SFC-client pairings. In one or more embodiments of the invention, the SFC prioritization is a method for determining an order of processing the SFCs in the SFC request. The order may be determined based on the clients. For example, the clients may be prior ranked, and the SFCs associated with the higher-ranked clients may be earlier in the order. Alternatively, the SFCs may be ordered based on the complexity of the SFC. Specifically, SFCs with more elements may be earlier in the order than SFCs with fewer elements. Conversely, the ordering may be random without departing from the invention.

In one or more embodiments of the invention, the SFC-client pairings refer to a SFC that further specifies the corresponding client. In other words, the SFC-client pairings specified in the prioritized list specifies both the SFC and the corresponding client. For example, a client may correspond to multiple SFCs. Each SFC may be associated with a SFC-client pairing, with the aforementioned client specified in each SFC-client pairing.

In step 204, an unprocessed SFC-client pairing is selected from the prioritized list. In one or more embodiments of the invention, the SFC-client pairing is selected based on the remaining SFC-client pairings that have not been processed via steps 206-210. The selection may be based on the ordering of the prioritized list.

In step 206, a set of candidate local data systems are determined based on a resource availability mapping. In one or more embodiments of the invention, the set of candidate local data systems are determined based on whether the resource availability mapping specifies whether the local data system is capable of performing any of the elements of the selected SFC. Further, the set of candidate local data systems is determined based on the respective network connectivity of each local data system with respect to the client of the selected SFC-client pairing.

In step 208, a local data system analysis is performed on the candidate local data systems to assign a placement for each VNF and/or service in the SFC-client pairing in the local data systems. In one or more embodiments of the inventions, the local data system analysis is a method for analyzing multiple combinations of local data system-element potential assignments to determine a most cost-efficient combination that results in the assignment of the element to the local data system.

In one or more embodiments of the invention, the local data system analysis is performed in accordance with FIG. 2B. The local data system analysis may be performed in accordance with any other method without departing from the invention.

In step 210, the resource availability mapping is updated based on the assigned placement. In one or more embodiments of the invention, the resource availability mapping is updated to specify that the computing resources are to be allocated to the functionality of the assigned element. The update may result in a local data system that was assigned to an element to no longer be available as a candidate local data system in later SFC-client pairings that are yet to be processed.

In step 212, a determination is made about whether all SFC-client pairings in the prioritized list are processed. If all SFC-client pairings are processed, the method proceeds to step 214; otherwise, the method proceeds to step 204.

In step 214, deployment of the SFCs in the assigned local data systems is initiated. In one or more embodiments of the invention, the deployment of the SFCs includes prompting each local data system to perform the functionality of the corresponding assigned element(s) of one or more SFCs as determined for each SFC-client pair.

FIG. 2B shows a flowchart for performing a local data system analysis in accordance with one or more embodiments of the invention. The method shown in FIG. 2B may be performed by, for example, a SFC orchestrator (100, FIG. 1A). Other components of the system illustrated in FIG. 1A or FIG. 1B may perform the method of FIG. 2B without departing from the invention.

In step 220, an order of elements in the SFC is identified. In one or more embodiments of the invention, the order of elements is specified in the SFC-client pairing. As discussed above, the elements may include VNFs and/or services.

In step 222, a candidate local data system (LDS)-element combination for each element in the SFC is selected. In one or more embodiments of the invention, the candidate LDS-element combination is a combination of potential assignments of each element in the SFC to a LDS that would enable the LDSs to perform the functionality of the SFC. In one or more embodiments of the invention, the elements to the LDSs in the LDS-element combination would be assigned such that each of the LDSs are capable of performing the functionality of the potentially assigned element. The selected candidate LDS-element may be one that has not been processed in accordance with step 224.

In step 224, a cost analysis for the candidate LDS-element combination is performed based on the computing resources of the candidate LDSs to obtain a combination cost. In one or more embodiments of the invention, the cost analysis is a process for calculating a combination cost for a LDS-element combination. The calculation of the potential cost may be based on a latency cost between connections of each LDS in the LDS-element combination. For example, a connection between a first LDS assigned a first VNF and a second LDS assigned a second VNF may incur a latency cost. In contrast, a LDS performing both VNFs may incur a minimal latency cost for communication between the two VNFs. The combination cost may include all latency costs for communications between each elements in the SFC.

In one or more embodiments of the invention, the combination cost further specifies a processing time cost for each LDS performing an element. For example, a first VNF may require a processing time per execution of a request. The processing time may be calculated in the processing time cost of the element. A processing time cost of an LDS-element pair may vary from one LDS performing the element to another LDS without departing from the invention. The sum of the calculated processing time costs, of each element in the SFC performed by a LDS, may be further included in the combination cost.

In step 226, a determination is made about whether all LDS-element combinations are processed. If all LDS-element combination elements are processed, the method proceeds to step 228; otherwise, the method proceeds to step 222.

In step 228, a combination cost optimization is performed based on the combination costs of each LDS-element combination to assign a placement for each element (e.g., each VNF and service) in the SFC. In one or more embodiments of the invention, the combination cost optimization is a process for identifying the LDS-element combination with a minimum combination cost. The combination cost optimization may be performed by applying a minimization function on the combination costs as functions of the LDS-element pairings.

In one or more embodiments of the invention, following the identification of the LDS-element combination with a minimum combination cost, each element may be assigned to the corresponding LDS of the LDS-element combination.

Example

Figure 3A:
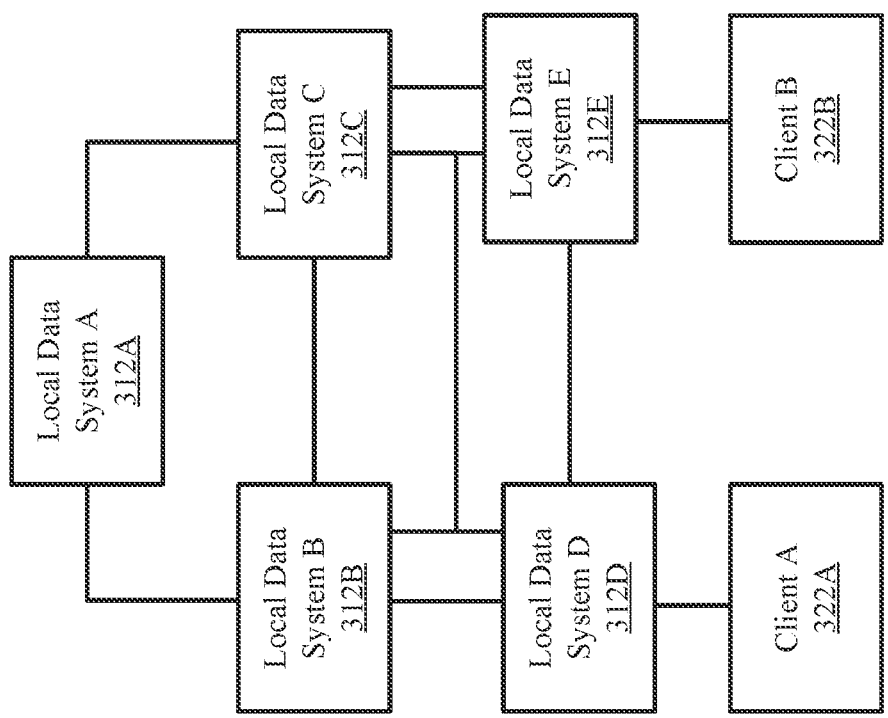
FIGS. 3A-3B show an example in accordance with one or more embodiments of the invention.
Figure 3B:
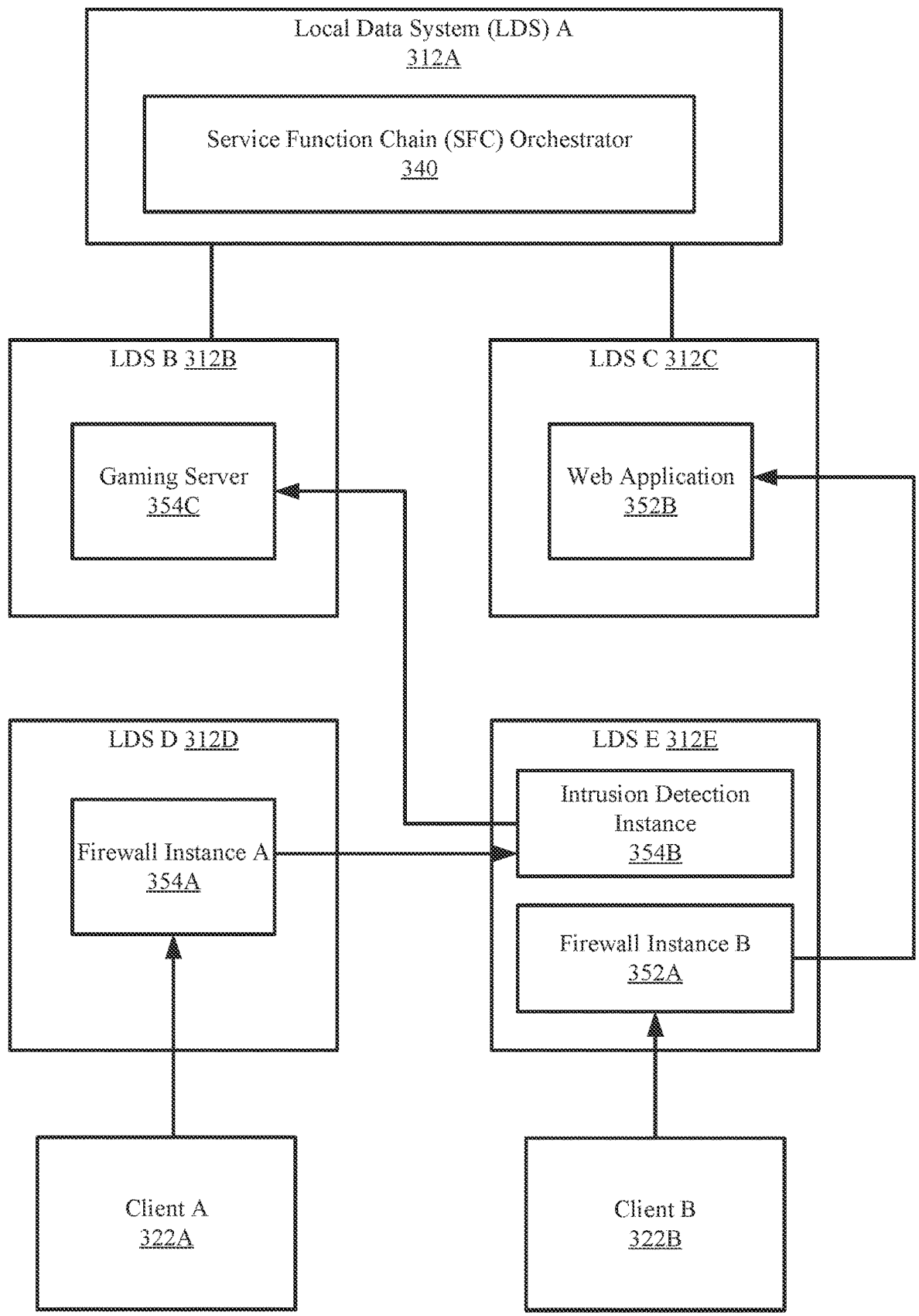

The following section describes an example. The example, illustrated in FIGS. 3A-3B, is not intended to limit the invention. Turning to the example, consider a scenario in which two clients request to utilize a system of local data systems (LDSs) to execute a SFC for each client.

FIG. 3A shows an example system in accordance with one or more embodiments of the invention. The system includes client A (322A) and client B (322B). Each client (322A, 322B) desires to execute a SFC using a system of LDSs that includes LDS A (312A), LDS B (312B), LDS C (312C), LDS D (312D), and LDS E (312E).

The LDSs in the system are operatively connected via a layer network organization. A first layer that includes LDS D (312D) and LDS E (312E) is connected to the clients (322A, 322B). Specifically, LDS D (312D) is connected to client A (322A), and LDS E (312E) is connected to both client B (312B) and LDS D (312D). A second layer includes LDS B (312B) and LDS C (312C), each connected to each other, to each LDS (312D, 312E) in the first layer, and to LDS A (312A). The third layer includes LDS A (312A). In this example, LDS B (312B), LDS C (312C), LDS D (312D) and LDS E (312E) are implemented as edge devices. LDS A (312A) is implemented as a cloud service host. A service function chain (SFC) orchestrator (340) may be installed in LDS A (312A). The SFC orchestrator (340) is used to assign and deploy elements of the two SFCs.

Client A (322A) requests to implement a first SFC using the LDSs (312A, 312B, 312C, 312D, 312E). The first SFC includes utilizing a gaming server that is accessed by client A (322A) using a firewall and an intrusion detection instance. The order of access is first implementing the firewall instance, then implementing the intrusion detection instance, then accessing the gaming server.

Client B (322B) requests to implement a second SFC using the LDSs (312A, 312B, 312C, 312D, 312E). The second SFC includes utilizing a website application that is accessed by client B (322B) using a firewall. The order of access is first implementing the firewall instance, then accessing the website application.

An SFC request is obtained by the SFC orchestrator (340) that specifies the two SFCs and their corresponding client. The SFC orchestrator (340) performs the method of FIGS. 2A-2B to assign and deploy the two SFCs in the LDSs (312A, 312B, 312C, 312D, 312E). Specifically, the SFC orchestrator (340) prioritizes the two SFCs based on the number of elements. The first SFC is prioritized first for having three elements (i.e., the firewall instance, the intrusion detection instance, and the gaming server) over the second SFC for having two elements (i.e., the firewall instance and the web application).

Following the prioritization, the SFC orchestrator (340) selects the first SFC for processing. The processing includes identifying the available candidate LDSs, which includes LDSs B, C, D, and E (312B, 312C, 312D, 312E). Following the identification, a local data system analysis is performed on the candidate LDSs (312B, 312C, 312D, 312E). The local data system analysis includes analyzing each combination cost for each combination of SFC assignments. A first combination may include placing the firewall instance in LDS B (312B), the intrusion detection in LDS C (312C), and the gaming server in LDS D (312D). The combination cost includes the latency cost of client A (322A) accessing LDS B (312B), the latency cost of LDS B (312B) accessing LDS C (312C), and the latency cost of LDS C (312C) accessing LDS D (312D). Due to the high latency cost of client A (322A) accessing LDS B (312B), this combination cost is not considered an optimal combination. A second combination may include placing the firewall instance in LDS D (312D), the intrusion detection instance in LDS E (312E). The combination cost of the second combination includes the latency cost of client A (322A) accessing LDS D (312D), the latency cost of LDS D (312D) accessing LDS E (312E), and LDS E (312E) accessing LDS B (312B).

For the sake of brevity, not all combinations are discussed in this example. However, the SFC orchestrator (340) performs the cost analysis for each potential combination. Following the cost analyses, an optimization is performed to determine that the second combination is an optimal combination. Based on this determination, the SFC orchestrator (340) assigns: (i) firewall instance A (354A) to LDS D (312D), (ii) an intrusion detection instance (354B) to LDS E (312E), and (iii) the gaming server (354C) to LDS B (312B).

Following the assigning of the elements of the first SFC, a resource availability mapping is updated to specify the computing resources of LDSs D, E, and B (312D, 312E, 312B) being used for the implementation of the corresponding elements of the first SFC. The resource availability mapping, following the update, specifies that LDS D (312D) and LDS B (312B) do not have any computing resources available for additional elements of SFCs.

Following the assigning of the first SFC and the update to the resource availability mapping, the SFC orchestrator (340) selects the second SFC for processing. The processing includes identifying the available candidate LDSs, which include LDSs C and E (312C, 312E). Following the identification, a second local data system analysis is performed on the second candidate LDSs (312C, 312E). The second local data system analysis includes analyzing each combination cost for each combination of SFC assignments. A first combination may include placing the firewall instance in LDS E (312E) and the web application in LDS C (312C). The combination cost includes the latency cost of client B (322B) accessing LDS E (312E) and the latency cost of LDS E (312E) accessing LDS C (312C). A second combination may include placing the firewall instance in LDS C (312C) and the web application in LDS E (312E). The combination cost of the second combination includes the latency cost of client B (322B) accessing LDS C (312C), the latency cost of LDS C (312C) accessing LDS E (312E). A third combination includes placing both the firewall instance and the web application in LDS C (312C). Due to the lack of available computing resources required by LDS C (312C) to implement the two elements, this third combination is not considered.

The SFC orchestrator (340) performs the cost analysis for each potential combination for the second SFC. Following the cost analyses, an optimization is performed to determine that the first combination is an optimal combination. Based on this determination, the SFC orchestrator (340) assigns: (i) firewall instance B (352A) to LDS E (312E) and (ii) the web application (352B) to LDS C (312C).

Following the assignments of both SFCs, the SFC orchestrator (340) initiates deployment of the SFCs such that the elements are installed in the corresponding LDSs (312B, 312C, 312D, 312E).

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of a distributed environment of one or more computing devices. More specifically, embodiments of the invention improve the operations of assigning network functionality to a system of computing devices. By proactively assigning multiple virtual network functions to the available computing devices, embodiments of the invention ensure an efficient operation of the multiple computing devices, to increase the total functionality available for the system.

Thus, embodiments of the invention may address the problem of inefficient use of computing resources in a distributed environment. This problem arises due to the technological nature of the distributed environment.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a service function chain (SFC) orchestrator, a SFC request for a SFC and a second SFC, wherein the SFC comprises at least one virtual network function (VNF) and one service;
in response to the SFC request:
performing a SFC prioritization on the SFC and a second SFC to obtain a prioritized list,
wherein the SFC prioritization is based on a complexity of the SFC and a second complexity of the second SFC,
wherein the prioritized list specifies the SFC first and the second SFC second;

determining, based on the prioritized list, a set of candidate local data systems (LDSs) for the SFC based on a resource availability mapping;
performing, by the SFC orchestrator, a LDS analysis on the set of candidate LDSs;
based on the LDS analysis:
assigning the VNF to a candidate LDS of the set of candidate LDSs;
assigning the service to a second LDS of the set of candidate LDSs; and
based on the assigning of the VNF and the assigning of the service, initiating, by the SFC orchestrator, a deployment of the VNF and the service,
wherein the SFC orchestrator executes as an application on the candidate LDS.

2. The method of claim 1, further comprising:
after the assigning of the VNF and the assigning of the service and before initiating the deployment:
updating the resource availability mapping based on the assigning of the VNF and the assigning of the service to obtain an updated resource availability mapping, wherein the second SFC comprises a second VNF and a second service;
determining a second set of candidate LDSs for the second SFC based on the updated resource mapping;
performing a second LDS analysis on the second set of candidate LDSs;
based on the second LDS analysis:
assigning the second VNF to a third LDS of the set of candidate LDSs; and
assigning the second service to a fourth LDS of the set of candidate LDSs, wherein the deployment is further initiated for the second VNF and the second service.

3. The method of claim 1, wherein the second LDS is the candidate LDS.

4. The method of claim 1, wherein the local data system analysis comprises:
identifying a plurality of LDS-element combinations corresponding to the SFC, wherein a first LDS-element combination of the plurality of LDS-element combinations specifies the VNF assigned to the LDS and the service assigned to the second LDS;
performing a cost analysis for each LDS-element combination of the plurality of LDS-element combination to obtain a plurality of combination costs;
performing a combination cost optimization on the plurality of combination costs; and
making a determination, based on the combination cost optimization, that a combination cost associated with the first LDS-element combination is most optimal.

5. The method of claim 1, wherein the VNF comprises one of: a firewall instance, an intrusion detection application instance, a login instance, a network traffic monitoring agent, and a network usage monitoring agent.

6. The method of claim 1, wherein the SFC specifies an order of performing the VNF first and the service second.

7. A non-transitory computer readable medium comprising computer readable program code, which when executed by a computer processor enables the computer processor to perform a method, the method comprising:
obtaining, by a service function chain (SFC) orchestrator, a SFC request for a SFC and a second SFC, wherein the SFC comprises at least one virtual network function (VNF) and one service;
in response to the SFC request:

performing a SFC prioritization on the SFC and a second SFC to obtain a prioritized list,
wherein the SFC prioritization is based on a complexity of the SFC and a second complexity of the second SFC,
wherein the prioritized list specifies the SFC first and the second SFC second;
determining, based on the prioritized list, a set of candidate local data systems (LDSs) for the SFC based on a resource availability mapping;
performing, by the SFC orchestrator, a LDS analysis on the set of candidate LDSs;
based on the LDS analysis:
assigning the VNF to a candidate LDS of the set of candidate LDSs;
assigning the service to a second LDS of the set of candidate LDSs; and
based on the assigning of the VNF and the assigning of the service, initiating, by the SFC orchestrator, a deployment of the VNF and the service,
wherein the SFC orchestrator executes as an application on the candidate LDS.

8. The non-transitory computer readable medium of claim 7, further comprising:
after the assigning of the VNF and the assigning of the service and before initiating the deployment:
updating the resource availability mapping based on the assigning of the VNF and the assigning of the service to obtain an updated resource availability mapping, wherein the second SFC comprises a second VNF and a second service;
determining a second set of candidate LDSs for the second SFC based on the updated resource mapping;
performing a second LDS analysis on the second set of candidate LDSs;
based on the second LDS analysis:
assigning the second VNF to a third LDS of the set of candidate LDSs; and
assigning the second service to a fourth LDS of the set of candidate LDSs,
wherein the deployment is further initiated for the second VNF and the second service.

9. The non-transitory computer readable medium of claim 7, wherein the second LDS is the candidate LDS.

10. The non-transitory computer readable medium of claim 7, wherein the local data system analysis comprises:
identifying a plurality of LDS-element combinations corresponding to the SFC,
wherein a first LDS-element combination of the plurality of LDS-element combinations specifies the VNF assigned to the LDS and the service assigned to the second LDS;
performing a cost analysis for each LDS-element combination of the plurality of LDS-element combination to obtain a plurality of combination costs;
performing a combination cost optimization on the plurality of combination costs; and
making a determination, based on the combination cost optimization, that a combination cost associated with the first LDS-element combination is most optimal.

11. The non-transitory computer readable medium of claim 7, wherein the VNF comprises one of: a firewall instance, an intrusion detection application instance, a login instance, a network traffic monitoring agent, and a network usage monitoring agent.

12. The non-transitory computer readable medium of claim 7, wherein the SFC specifies an order of performing the VNF first and the service second.

13. A system, comprising:
a processor; and
memory comprising instructions, which when executed by the processor, perform a method, the method comprising:
obtaining, by a service function chain (SFC) orchestrator, a SFC request for a SFC, wherein the SFC comprises at least one virtual network function (VNF) and one service;
in response to the SFC request:
performing a SFC prioritization on the SFC and a second SFC to obtain a prioritized list,
wherein the SFC prioritization is based on a complexity of the SFC and a second complexity of the second SFC,
wherein the prioritized list specifies the SFC first and the second SFC second;
determining, based on the prioritized list, a set of candidate local data systems (LDSs) for the SFC based on a resource availability mapping;
performing, by the SFC orchestrator, a LDS analysis on the set of candidate LDSs;
based on the LDS analysis:
assigning the VNF to a candidate LDS of the set of candidate LDSs;
assigning the service to a second LDS of the set of candidate LDSs; and
based on the assigning of the VNF and the assigning of the service, initiating, by the SFC orchestrator, a deployment of the VNF and the service,
wherein the SFC orchestrator executes as an application on the candidate LDS.

14. The system of claim 13, further comprising:
after the assigning of the VNF and the assigning of the service and before initiating the deployment:
updating the resource availability mapping based on the assigning of the VNF and the assigning of the service to obtain an updated resource availability mapping,
wherein the second SFC comprises a second VNF and a second service;
determining a second set of candidate LDSs for the second SFC based on the updated resource mapping;
performing a second LDS analysis on the second set of candidate LDSs;
based on the second LDS analysis:
assigning the second VNF to a third LDS of the set of candidate LDSs; and
assigning the second service to a fourth LDS of the set of candidate LDSs,
wherein the deployment is further initiated for the second VNF and the second service.

15. The system of claim 13, wherein the second LDS is the candidate LDS.

16. The system of claim 13, wherein the local data system analysis comprises:
identifying a plurality of LDS-element combinations corresponding to the SFC,
wherein a first LDS-element combination of the plurality of LDS-element combinations specifies the VNF assigned to the LDS and the service assigned to the second LDS;
performing a cost analysis for each LDS-element combination of the plurality of LDS-element combination to obtain a plurality of combination costs;
performing a combination cost optimization on the plurality of combination costs; and
making a determination, based on the combination cost optimization, that a combination cost associated with the first LDS-element combination is most optimal.

17. The system of claim 13, wherein the VNF comprises one of: a firewall instance, an intrusion detection application instance, a login instance, a network traffic monitoring agent, and a network usage monitoring agent.

* * * * *